United States Patent
Cho

(10) Patent No.: US 8,136,802 B2
(45) Date of Patent: Mar. 20, 2012

(54) LEVEL COMPENSATOR HAVING A VACUUM PUMP THEREIN

(75) Inventor: Ho-Young Cho, Seoul (KR)

(73) Assignee: Korea Pneumatic System Co., Ltd, Seoul (KR)

( * ) Notice: Subject to any disclaimer, the term of this patent is extended or adjusted under 35 U.S.C. 154(b) by 402 days.

(21) Appl. No.: 12/450,339

(22) PCT Filed: Jan. 29, 2008

(86) PCT No.: PCT/KR2008/000535
§ 371 (c)(1),
(2), (4) Date: Sep. 21, 2009

(87) PCT Pub. No.: WO2008/117928
PCT Pub. Date: Oct. 2, 2008

(65) Prior Publication Data
US 2010/0032534 A1    Feb. 11, 2010

(30) Foreign Application Priority Data
Mar. 27, 2007   (KR) .................. 10-2007-0029795

(51) Int. Cl.
*B25B 11/00* (2006.01)
(52) U.S. Cl. ................... 269/21; 269/20; 248/205.9
(58) Field of Classification Search ............ 269/21, 269/20, 900, 903; 248/205.9; 294/64.1
See application file for complete search history.

(56) References Cited

U.S. PATENT DOCUMENTS

| | | | |
|---|---|---|---|
| 2,558,479 | A | 6/1951 | Miller |
| 2,934,086 | A | 4/1960 | Blatt |
| 3,804,397 | A | 4/1974 | Neumann |
| 4,397,491 | A | 8/1983 | Anderson |
| 4,651,396 | A * | 3/1987 | Kerlidou ............ 29/213.1 |
| 4,763,941 | A | 8/1988 | Sniderman |
| 4,796,357 | A | 1/1989 | Smith |
| 4,995,662 | A | 2/1991 | Hawkswell |
| 5,169,192 | A | 12/1992 | Allison et al. |
| 5,308,132 | A | 5/1994 | Kirby et al. |

(Continued)

FOREIGN PATENT DOCUMENTS

JP          01-282460          11/1989

(Continued)

OTHER PUBLICATIONS

Int'l Search Report, May 22, 2008.

(Continued)

*Primary Examiner* — Lee D Wilson
(74) *Attorney, Agent, or Firm* — Robert C. Klinger

(57) ABSTRACT

The present invention relates to a level compensator in a vacuum system including a fixing tube fixed to a structure, a hollow slider disposed in the fixing tube so as to move in a vertical direction, and a spring disposed between the fixing tube and the slider so as to elastically support the slider, in which a vacuum pump having an inflow port at one end, an outflow port at the other end, and an inhalation hole in a side wall thereof is mounted inside the slider. When compressed air guided to an upper opening in the slider passes between the inflow port and the outflow port and is discharged through a discharging port formed on the side wall of the slider, air is induced to the space inside the slider from the lower portion of the slider, and is discharged along with the compressed air.

10 Claims, 4 Drawing Sheets

U.S. PATENT DOCUMENTS

| | | | |
|---|---|---|---|
| 5,457,868 A * | 10/1995 | Blaimschein | 29/559 |
| 6,036,196 A | 3/2000 | Freund et al. | |
| 6,176,966 B1 | 1/2001 | Tsujimoto et al. | |
| 6,260,898 B1 | 7/2001 | Kano et al. | |
| 6,485,009 B2 | 11/2002 | Kashiwazaki et al. | |
| 6,663,092 B2 * | 12/2003 | Kashiwazaki et al. | 269/21 |
| 6,817,933 B2 * | 11/2004 | Blick | 451/388 |
| 7,416,176 B2 * | 8/2008 | Hamann | 269/266 |
| 2006/0138793 A1 | 6/2006 | Tanae et al. | |
| 2006/0231995 A1 * | 10/2006 | Wang et al. | 269/21 |
| 2010/0032534 A1 * | 2/2010 | Cho | 248/205.9 |

FOREIGN PATENT DOCUMENTS

| | | |
|---|---|---|
| JP | 03-003748 | 1/1991 |
| JP | 07-157117 | 6/1995 |
| JP | 10-253798 | 9/1998 |
| KR | 10-2004-0009803 | 1/2004 |

OTHER PUBLICATIONS

PCT Written Opinion, May 22, 2008.
Int'l Preliminary Report, May 22, 2009.

\* cited by examiner

[Fig. 1]
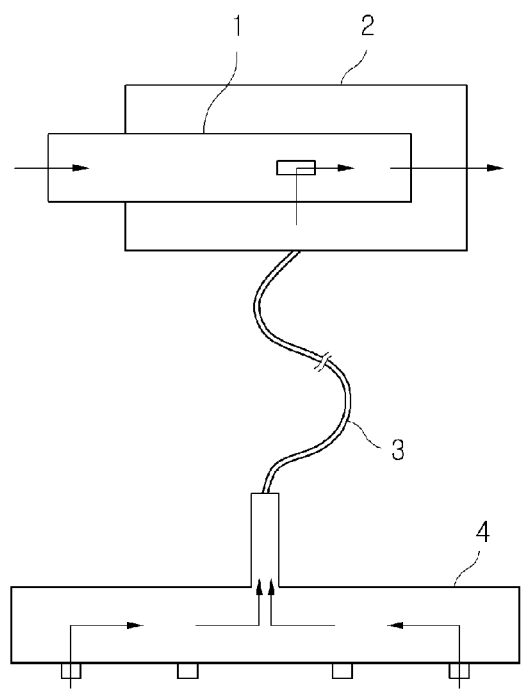
[Fig. 2]
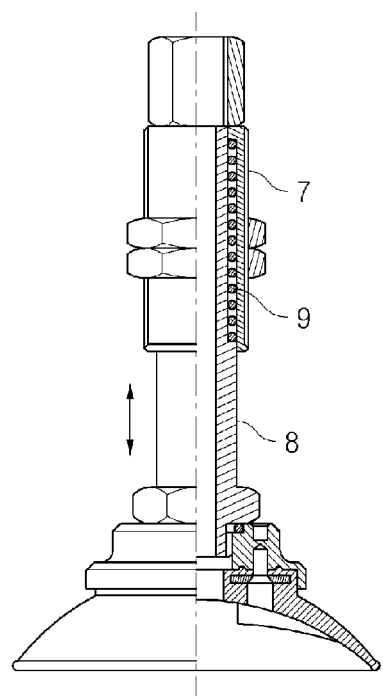

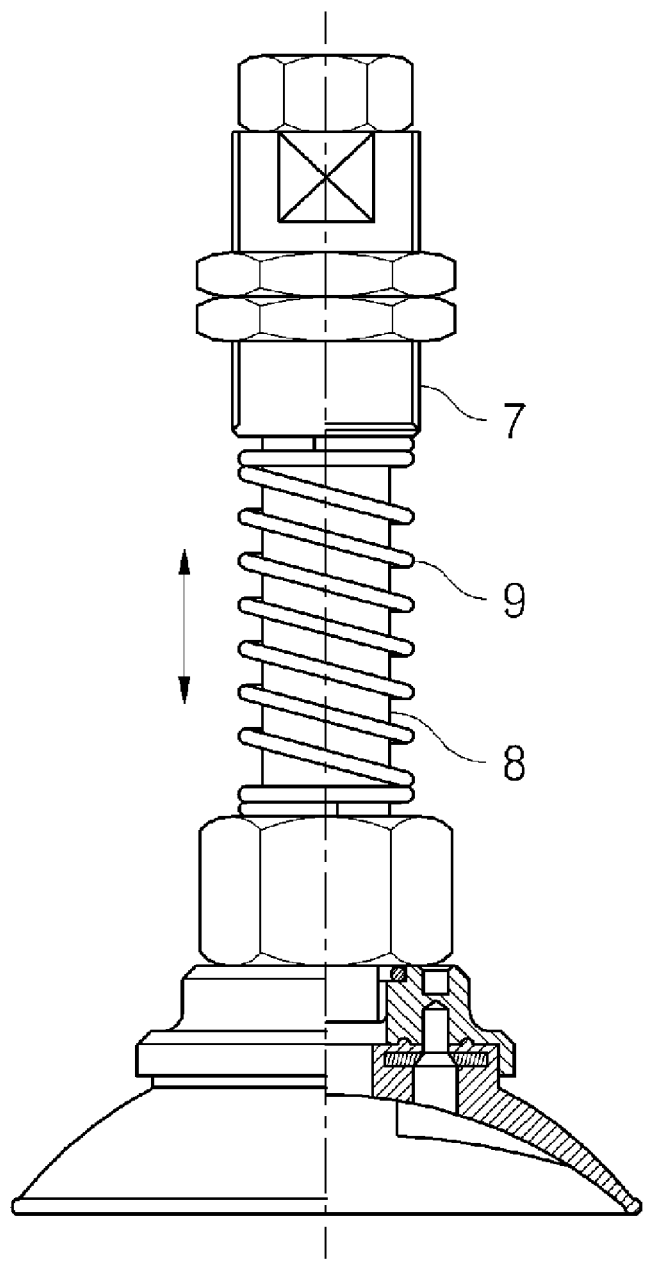
[Fig. 3]

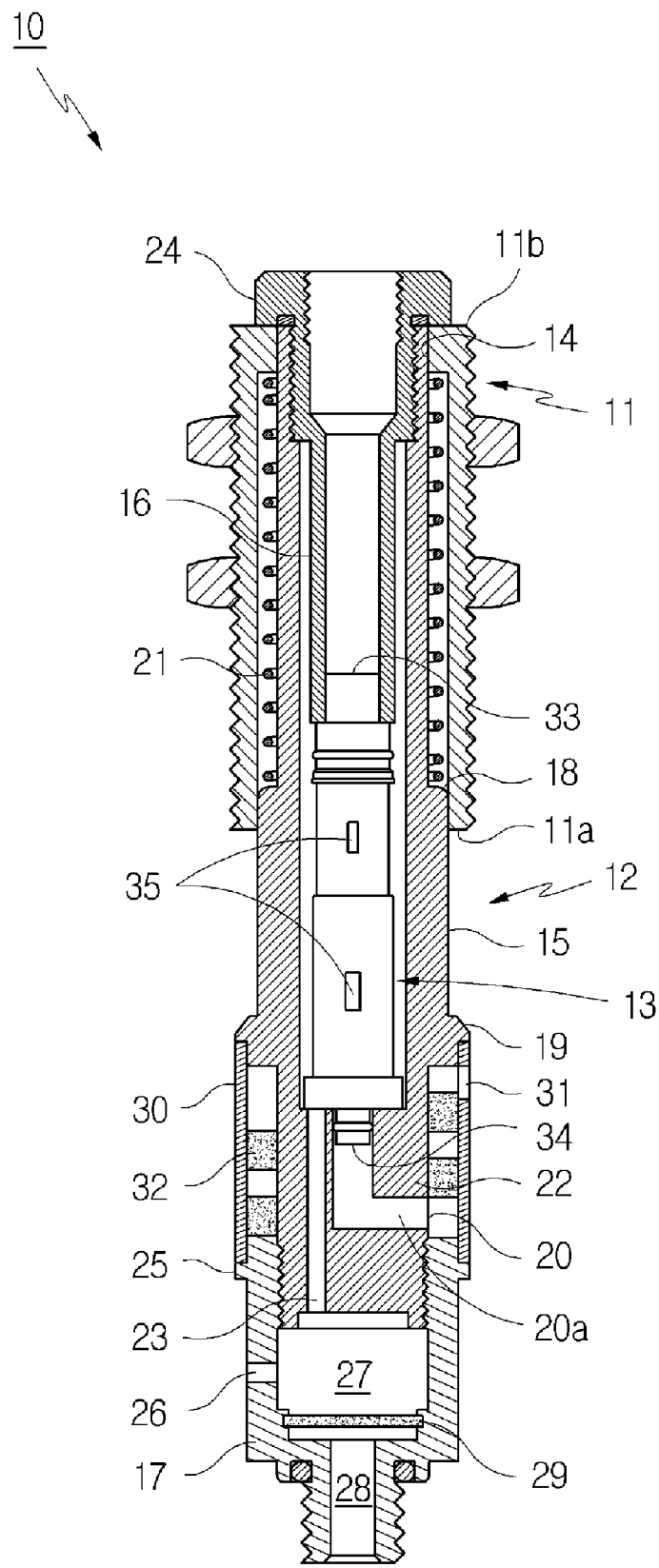
[Fig. 4]

[Fig. 5]
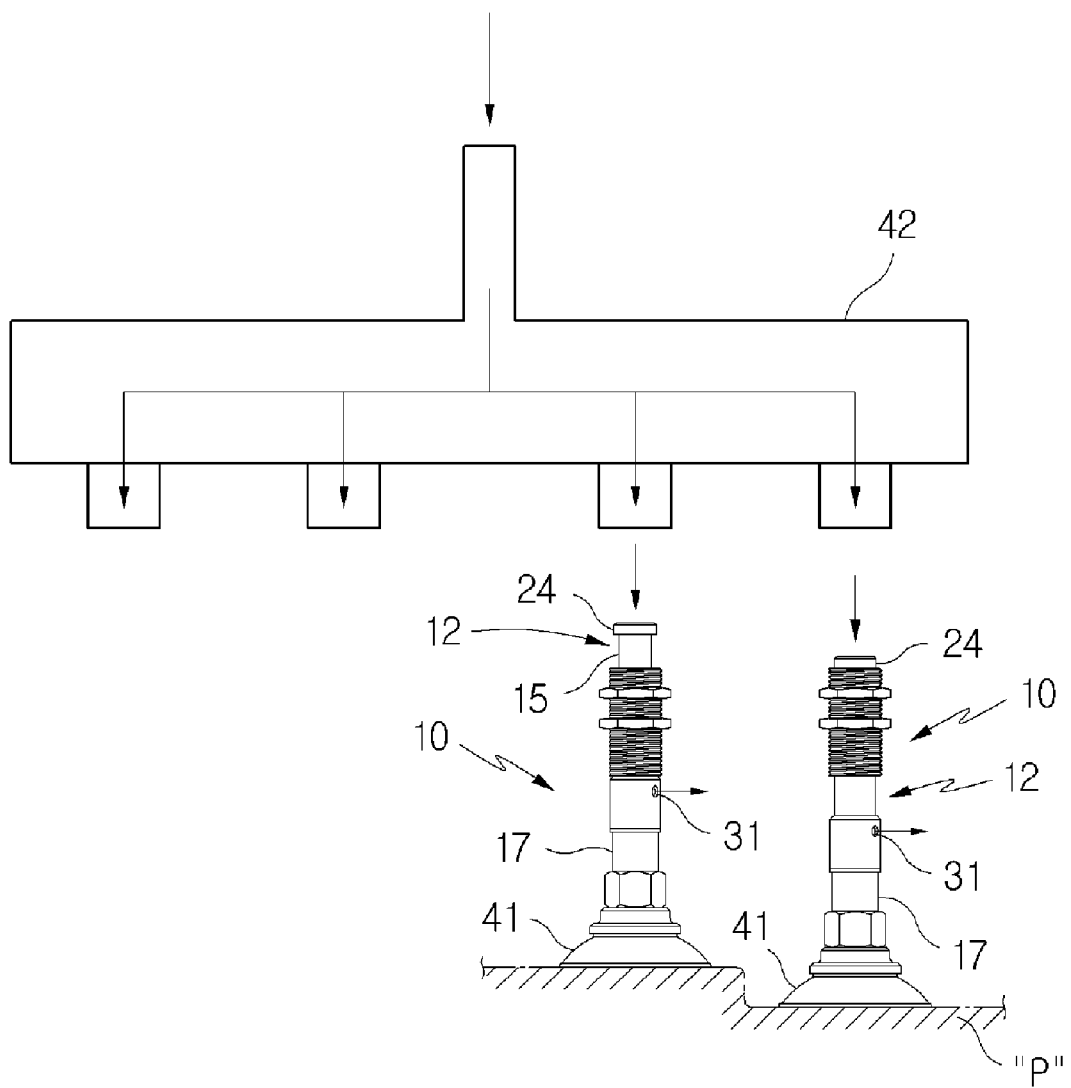

LEVEL COMPENSATOR HAVING A VACUUM PUMP THEREIN

TECHNICAL FIELD

The present invention relates to a level compensator used in a vacuum system, and more particularly to a level compensator including a vacuum pump therein.

BACKGROUND ART

With reference to FIG. 1, a general vacuum system includes a vacuum pump 1 which has an inflow port, an outflow port, and an inhalation port for air, a cylindrical or box-like housing 2 which provides a surrounding space communicating with the inhalation port of the vacuum pump 1, a hollow manifold 4 which is connected to the housing 2 through an absorbing line 3, and plural vacuum pads 5 which are connected to the manifold 4. When compressed air flows at a high speed and is discharged through the vacuum pump 1, air inside each vacuum pad 5 is induced to the inhalation port and discharged along with the compressed air, and a negative pressure is generated inside each vacuum pad 5 at the same time. The generated negative pressure is used to hold a work object and to raise or move the work object.

If the surface of the work object is flat, the plural vacuum pads 5 are easily fixed at the same level. However, there occurs a problem in which the contact pose or the position of each vacuum pad 5 on the work object is not stable and the surface of the work object is damaged when all of the vacuum pads are flush with each other even in the case where a curved portion or a stepped portion is present on the surface. In order to solve this problem, a level compensator 6 is used in conjunction with the vacuum pads 5.

FIGS. 2 and 3 show an example of the level compensator according to a known technique. For convenience, the same reference numerals are given to functionally similar elements in both figures. The known level compensator includes a cylindrical fixing tube 7, a tube-shaped slider 8 which passes through the fixing tube 7 to perform up-and-down movement, and a spring 9 which is disposed between the fixing tube 7 and the slider 8 to elastically support the movement of the slider 8. A vacuum pad connected to the lower end of the slider 8 moves along with the slider 8, and thus the level of the vacuum pad is appropriately compensated in accordance with the state of the surface of a work object. The level compensator also serves as an impact absorber for absorbing impact occurring in the work object.

In a general vacuum system, in fact, the known level compensator is used as an apparatus for appropriately compensating the level of the vacuum pad in accordance with the state of the surface of the work object. However, the level compensator has problems in that the level compensator may have only limited uses, the system may become more complicated when using the level compensator, and an absorbing line may become longer when using the level compensator.

DISCLOSURE

Technical Problem

The invention is contrived to solve the above-mentioned problems with the known level compensator. An object of the invention is to provide a level compensator which allows a vacuum system to be configured more simply. Another object of the invention is to provide a level compensator capable of realizing a more rapid vacuum response speed by obviating the absorbing line from the vacuum system. Still another object of the invention is to provide a level compensator capable of effectively reducing noise.

Technical Solution

According to the invention, a level compensator includes: a fixing tube which is fastened to a structure; a hollow slider which is disposed inside the fixing tube so as to perform up-and-down movement; and a spring which is disposed between the fixing tube and the slider to elastically support the movement of the slider. In particular, a vacuum pump, which includes an inflow port formed in one end thereof, an outflow port formed in the other end thereof, and an inhalation hole formed in a side wall thereof is mounted in a space inside the slider. In addition, when compressed air guided to an upper opening port of the slider passes between the inflow port and the outflow port of the vacuum pump and is discharged through a discharging port formed in a side wall of the slider, air communicating with the lower portion of the slider is induced to the inner space in the slider and passes through the inhalation hole of the vacuum pump to be discharged along with the compressed air.

More specifically, the slider may include: a hollow body, the upper portion of which is disposed inside the fixing tube; a guide tube, which is inserted into an upper opening port of the body to be fastened; and a support member, which is formed spaced apart from and facing an insertion end portion of the guide tube inside the body, and which is formed with a cylinder hole allowing a space inside the body and a vacuum pad to communicate with each other, and a passage allowing the space inside the body and a discharging port formed on a side wall of the body to communicate with each other. In addition, the vacuum pump includes the inflow port formed in one end thereof, the outflow port formed in the other end thereof, and the inhalation hole formed on the side wall thereof, and is mounted in the space inside the body so that the inflow port is connected to the insertion end portion of the guide tube and the outflow port is connected to an entrance of the passage of the support member.

According to the invention, the vacuum pump is mounted in the space inside the level compensator. That is, the level compensator is used not as an absorbing line but as a vacuum generating apparatus. Accordingly, in the vacuum system using the level compensator according to the invention, a housing, the absorbing line, or the like for providing a space surrounding the vacuum pump is not used, thereby simplifying the configuration of the vacuum system and allowing the vacuum response speed to be very rapid with respect to the compressed air.

Advantageous Effects

A level compensator according to the invention includes a vacuum pump therein. Accordingly, an advantage is obtained in that the configuration of a vacuum system for generating a negative pressure is more simplified and the vacuum response speed is very rapid with respect to compressed air. Moreover, an advantage is obtained in that it is possible to effectively realize noise prevention using a noise-absorbing member and air filtering using a filter.

DESCRIPTION OF DRAWINGS

FIG. 1 is a diagram illustrating the configuration and operation of a general vacuum system;

FIGS. 2 and 3 are sectional views illustrating an example of a level compensator according to a known technique;

FIG. 4 is a sectional view illustrating a level compensator according to the best mode of the invention; and FIG. 5 is a diagram illustrating the configuration and an operation of a vacuum system which uses the level compensator shown in FIGS. 2 and 3.

BRIEF DESCRIPTION OF KEY ELEMENTS OF THE DRAWINGS

10: LEVEL COMPENSATOR
11: FIXING TUBE
12: SLIDER
13: VACUUM PUMP
15: BODY
16: GUIDE TUBE
17: CONNECTING TUBE
20: OUTFLOW PORT
26: HOLE
29: FILTER
30: COVERING
31: DISCHARGING PORT

BEST MODE

The features and advantages of the invention, which are described above, or other features and advantages of the invention will be more apparent from the following description made below with reference to the accompanying drawings.

With reference to FIGS. 4 and 5, Reference Numeral 10 indicates a level compensator according to the best mode of the invention. The level compensator 10 includes a cylindrical fixing tube 11, a slider 12 which passes through the fixing tube 11 to perform up-and-down movement, and a vacuum pump 13 which is mounted in the slider 12.

The fixing tube 11 is a member which is connected to a structure such as a manifold, a frame, or a blanket. The general position of the level compensator 10 is fixed by the fixing tube 11. On the surface of the fixing tube 11, screws for connection with a different structure are provided and nut members are provided. An inward protrusion 14 coming in contact with the upward outer surface of a body 15 of the slider 12 is formed in the upper end of the fixing tube 11.

The slider 12, which is longer than the fixing tube 11, includes the hollow slide body 15, the upper portion of which is disposed inside the fixing tube 11, a guide tube 16 which is inserted into the upper opening port of the body 15 to a predetermined depth, and a connecting tube 17, which is fastened in the lower end of the body 15. A vacuum pad 41 is connected to the lower portion of the connecting tube 17.

On the surface of the body 15, an outward protrusion 18 coming in contact with the lower inner surface of the fixing tube 11 is formed, a bulging flange 19 is formed below the outward protrusion 18, and a discharging port 20 for air is formed below the flange 19. In addition, a spring 21 is inserted in a space extended vertically by the inward protrusion 14 of the fixing tube 11 and the outward protrusion 18 of the body 15. According to another mode of the invention, the spring 21 may be disposed between the lower end 11a of the fixing tube 11 and the flange 19 (see FIG. 2b). In this case, the protrusion structures 14 and 18 according to this mode of the invention are not required.

In the lower inside of the body 15, a support member 22 is integrally formed so as to be spaced apart from and to face the insertion end portion of the guide tube 16. In the support member 22, there are formed a cylinder hole 23 for communicating the space inside the body 15 and the connecting tube 17 with each other, and a passage 20a for communicating the space inside the body 15 and the discharging port 20 with each other.

The guide tube 16 is inserted into the upper opening port of the body 15 to a predetermined depth. A flange 24 is formed on the upper side, so that the guide tube 16 and the body 15 are suspended on the upper end surface 11b of the fixing tube 11.

The connecting tube 17 is fastened to the lower end of the body 15 to communicate the body 15 and the vacuum pad 41 with each other. However, in another mode of the invention, the vacuum pad may be configured so as to be directly fastened to the lower end portion of the body 15. A flange 25 which is opposed to the flange 19 of the body 15 is formed in the upper portion of the connecting tube 17, and a vacuum releasing hole 26 passing through the inside of the connecting tube is formed in one side of the connecting tube. The connecting tube 17 is divided into a large inner diameter portion 27 close to the body 15 and a small inner diameter portion 28 close to the vacuum pad 41. A filter 29 can be placed in the large inner diameter portion 27. In addition, the vacuum releasing hole 26 is located above the filter 29.

A cylindrical covering 30 formed with an outflow port 31 is provided between the two flanges 19 and 25 which are opposed to each other. The outflow port 31 communicates with the discharging port 20 of the body 15. In addition, a noise-absorbing member 32 for removing noise of the level compensator is disposed in a space formed between the body 15 and the covering 30. The noise-absorbing member 32 preferably has a spiral shape in consideration of outflow efficiency and sound-absorbing efficiency.

The vacuum pump 13, which has an inflow port 33 in one end thereof and an outflow port 34 in the other end thereof, and inhalation holes 35 on the side surface thereof, is a general rotationally symmetrical air pump. Although not shown in the figure, nozzles arranged in series are formed inside the vacuum pump 13. Like a general vacuum pump, this vacuum pump 13 creates a vacuum state in a surrounding space which is in flow communication with the inhalation holes 35 through the operation of compressed air passing through the nozzles therein at a high speed. In the invention, the surrounding space is a space inside the body 15.

The vacuum pump 13 is mounted coaxially in the space inside the body 15 in a state in which the inflow port 33 is connected to an insertion end of the guide tube 16 and the outflow port 34 is connected to an entrance of the passage 20a. Of course, the surface of the vacuum pump 13 does not come into contact with the inner surface of the body 15.

A vacuum system according to the invention includes the level compensators 10 and the vacuum pads 41 fastened in the lower portion of the connecting tube 17. In addition, a structure 42 for fixing the level compensators 10 is provided. The fixing tube 11 is connected to the structure 42, so that each of the level compensators 10 according to the invention is mounted. It is apparent that the vacuum system is very simply configured compared with a known vacuum system (see FIG. 1), in which vacuum pumps, a housing, absorbing lines, and the like are provided separately from level compensators.

As the structure 42, a manifold is taken as an example, but a frame or a blanket may be used. Alternatively, the compressed air can be supplied to each of the level compensators 10 through the structure 42. However, the compressed air may be supplied directly to each of the level compensators 10, rather than being supplied through the structure 42. In this case, the vacuum system can be more simplified.

For example, when the structure 42 is lowered, as shown in FIG. 4, at this time, impact is absorbed during the upward movement of the slider 12 of the level compensator 10 and the level of the vacuum pad 41 is elastically compensated at the same time that pressure is applied to the vacuum pad 41 in accordance with the surface height of a work object P.

In the state in which each vacuum pad 41 comes into contact with the surface of the work object P, the compressed air, which has been supplied to the structure 42 and has flowed into the guide tube 16, passes through the vacuum pump 13 at a high speed to be discharged outside through the outflow port 31, which is a final exit (see the arrow shown in FIG. 4). When discharging the air, noise generated in the apparatus is suppressed since the noise passes through the spiral noise-absorbing member.

At this time, the air inside the vacuum pad 41 is induced to the inhalation holes 35 of the vacuum pump 13 to be discharged to the outside along with the compressed air. Since dust or foreign substances in the air inside the vacuum pad 41 are filtered by the filter 29, the dust and the foreign substances do not enter the vacuum pump 13.

During the air discharging process, the space inside the slide body 15 enters a vacuum state and a negative pressure is generated inside the vacuum pad 41 at the same time. In this way, the level compensator 10 according to the invention is used not as an absorption line but as a vacuumizing apparatus. That is, since the absorption line is excluded in this system, the vacuum response speed with respect to the compressed air becomes very high. The vacuum pad 41 holds the work object P using the negative pressure generated in the above-described manner to carry the work object.

After carrying the work object, the compressed air flows in the vacuum releasing hole 26 and is supplied to the inside of the vacuum pad 41. The supply ports 16 and 26 for supplying the compressed air are selectively opened or closed by an electronic valve. The negative pressure in the vacuum pad 41 is released by air flowing in the vacuum releasing hole 26, and the vacuum pad 41 and the work object P are separated from each other. At this time, the foreign substances filtered by the lower surface of the filter 29 are shaken off while the compressed air flowing therein passes downward through the filter 29. As a result, there is an advantage in that the lifespan of the filter is increase.

The invention claimed is:

1. A level compensator comprising:
   a fixing tube which is fastened to a structure;
   a hollow slider which is disposed inside the fixing tube so as to perform up-and-down movement; and
   a spring which is disposed between the fixing tube and the slider so as to elastically support the movement of the slider,
   wherein a vacuum pump which includes an inflow port formed in one end thereof, an outflow port formed in the other end thereof, and an inhalation hole formed on a side wall thereof is mounted in a space inside the slider, and
   wherein when compressed air guided to an upper opening port of the slider passes between the inflow port and the outflow port of the vacuum pump and is discharged through a discharging port formed on a side wall of the slider, air communicating with the lower portion of the slider is induced to the space inside the slider and passes through the inhalation hole of the vacuum pump to be discharged along with the compressed air.

2. The level compensator according to claim 1, wherein the slider includes: a hollow body, the upper portion of which is disposed inside the fixing tube; a guide tube which is inserted into an upper opening port of the body to be fastened; and a support member which is formed spaced apart from and opposite an insertion end portion of the guide tube inside the body, and which is formed with a cylinder hole for allowing a space inside the body and a vacuum pad to communicate with each other and a passage for allowing the space inside the body and a discharging port formed on a side wall of the body to communicate with each other, and
   wherein the vacuum pump includes the inflow port formed in one end thereof, the outflow port formed in the other end thereof, and the inhalation hole formed on the side wall thereof, and the vacuum pump is mounted in the space inside the body so that the inflow port is connected to the insertion end of the guide tube and the outflow port is connected to an entrance of the passage of the support member.

3. The level compensator according to claim 2, wherein the guide tube is provided with an upper side flange 24 on the upper end surface of the fixing tube.

4. The level compensator according to claim 2, wherein the slider is fastened to the lower end of the body so as to include a connecting tube which serves as a medium for connecting the body and the vacuum pad so as to communicate with each other.

5. The level compensator according to claim 4, wherein the side wall of the connecting tube is formed with a vacuum releasing hole.

6. The level compensator according to claim 4, wherein an air filter is provided inside the connecting tube.

7. The level compensator according to claim 4, wherein the side wall of the connecting tube is formed with a vacuum releasing hole and the inside of the connecting tube is provided with an air filter such that the vacuum releasing hole is positioned above the air filter.

8. The level compensator according to claim 4, wherein a bulging flange 19 is formed above the discharging port formed on the side wall of the body, a flange 25 opposed to the flange 19 is formed above the connecting tube, and a covering formed with an outflow port communicating with the discharging port is provided between both the flanges 19 and 25.

9. The level compensator according to claim 8, wherein a noise-absorbing member is disposed in a space between the body and the covering.

10. The level compensator according to claim 9, wherein the noise-absorbing member has a spiral shape.

* * * * *